US006561404B2

(12) United States Patent
Raffoni

(10) Patent No.: US 6,561,404 B2
(45) Date of Patent: May 13, 2003

(54) AUTOMATED APPARATUS FOR FEEDING AND POSITIONING STRIPS IN MACHINES FOR MAKING RECTANGULAR FRAMES

(76) Inventor: Giuseppe Raffoni, Viale Bolognesi 24, 47100 Forli' (IT)

( * ) Notice: Subject to any disclaimer, the term of this patent is extended or adjusted under 35 U.S.C. 154(b) by 110 days.

(21) Appl. No.: 09/849,263

(22) Filed: May 7, 2001

(65) Prior Publication Data

US 2001/0039721 A1 Nov. 15, 2001

(30) Foreign Application Priority Data

May 11, 2000 (IT) ........................................ FO00A0011

(51) Int. Cl.[7] .............................. B23Q 3/00; B27F 7/09

(52) U.S. Cl. ........................... 227/2; 227/100; 227/140; 227/152; 227/148

(58) Field of Search ........................... 227/2, 6, 7, 100, 227/99, 140, 152, 154, 148

(56) References Cited

U.S. PATENT DOCUMENTS 4,830,257 A * 5/1989 Lin ............................ 227/152
4,876,787 A * 10/1989 Ditty et al. ................. 227/152
5,191,706 A * 3/1993 Cosden ....................... 227/140
5,611,248 A 3/1997 Peltier
6,010,053 A * 1/2000 Werfeli ....................... 227/148
6,164,512 A * 12/2000 Raffoni ....................... 227/152
6,220,494 B1 * 4/2001 Raffoni .......................... 227/2

FOREIGN PATENT DOCUMENTS

| | | |
|---|---|---|
| DE | 27 47 314 | 4/1979 |
| DE | 196 08 844 | 9/1997 |
| FR | 2 674 789 | 10/1992 |

OTHER PUBLICATIONS

Patent Abstracts of Japan vol. 018, No. 636 (M–1715), Dec. 5, 1994 & JP 06 246578 A (Fuji Shoji: KK), Sep. 6, 1994 * abstract; figures 1,3,5,8*.

* cited by examiner

*Primary Examiner*—Scott A. Smith

(57) ABSTRACT

An automated apparatus for feeding and positioning strips in machines for making rectangular frames which are equipped with four stapling units for joining, by steel staples, the strips that form the frames, wherein the strips are picked from corresponding conveyor belts and are transferred and positioned correctly in the stapling units by four motorized carriages which are provided with rotating arms fitted with clamps for gripping the individual strips and move on their respective guides, which are parallel to the conveyor belts that feed the strips for a first couple of the carriages and are perpendicular to the conveyor belts for a second couple of the carriages.

10 Claims, 11 Drawing Sheets

V
P
P
Q

W
V
P
P
U
P
S
L
G

P
U
Q

AUTOMATED APPARATUS FOR FEEDING AND POSITIONING STRIPS IN MACHINES FOR MAKING RECTANGULAR FRAMES

BACKGROUND OF THE INVENTION

The industrial production of wood frame-like structures, and particularly of rectangular frames for paintings, photographs, mirrors and other items, already uses automated systems and machines which, starting from four strips with both ends cut at 45°, pick them and place them between four stapling units which are meant to rigidly couple them, at the four corners of the frame, by virtue of appropriate steel staples to be inserted pneumatically astride the joint lines. Furthermore, by virtue of a system of electronically controlled motorized carriages, the mutual position of the stapling units is adapted in each instance to the dimensions of the frames being produced.

The facts summarized above are illustrated and described in detail in U.S. Pat. No. 6,164,512, in the name of the same Applicant as the present invention, which also provides for the use of particular devices that, after picking the four strips from one or more conveyors, by virtue of appropriate translational motions and rotations, would deposit them so as to compose the frame at the four stapling units.

The subsequent practical testing of this machine has allowed to ascertain practically the validity and efficiency of the individual devices and of their combination as well as the high quality level of production. However, careful analysis of the various steps of operation has revealed the need and the possibility to further increase the competitiveness of the machine, significantly increasing hourly production, which is currently penalized by a strip feeding system which is not adequate for the operating speed of the stapling units with which the machine is provided.

Moreover, in the meantime the need has also been felt to complete certain frames, during the assembly of the strips and therefore before joining them by means of the staples, by inserting a transparent plate or a panel of any kind in the appropriately slotted inner edge or, vice versa, by snugly inserting the inner edge of the strips in a corresponding perimetric slot of the panel to be framed.

SUMMARY OF THE INVENTION

Accordingly, the aim of the present invention is to provide an automated apparatus which, in addition to significantly reducing the time required to position the strips to be joined and the time required to adapt the machine to changes (even frequent ones) in the format of the frames to be assembled, allows the arrival of all the strips on a single side of the machine, so that any panels or sheets to be combined with the strips can be fed on the opposite side, thus achieving the removal of the finished products from one of the two sides that are perpendicular to the ones used for the two mutually opposite feeds.

Furthermore, since the strips arrive from the cropping unit to the machine in parallel rows and on the same side, this gives an advantage to the strip conveyance system, because it can pick them up from a single cropping unit and because the apparatus can itself be constituted by multiple lines in parallel.

The above aim and other objects which will become better apparent hereinafter, are achieved with an apparatus whose characteristics are defined in the claims. An apparatus according to the invention is advantageously but not exclusively fed, as shown in FIG. 11, by a conveyor which picks the strips prepared by a conventional cropping unit and conveys them toward a machine in accordance to the present invention.

The accompanying drawings clearly show that the strips L, which exit from the cropping unit G and are conveyed by the belt S, pass first on the two-track belt U and then continue on the four-track belt V, which conveys them to the four belts W which act as buffer storage, since each one is long enough to contain at least two strips in a row, and move when the downstream machine requests the strips with which the frame is to be formed in each instance.

By examining FIG. 17 in greater detail it can be noted that the strips standing by on the four buffer belts W are sorted so that there are two short ones in each one of the two intermediate belts and two long ones in each one of the two outer belts. This sorted arrangement is provided by three flaps P: one is arranged above the belt U (FIG. 18) and two are arranged above the belt V (FIG. 19), and said flaps are pivoted vertically to arms which cantilever out onto said belts and are actuated by a corresponding number of actuators Q so that each one can sort the strips in two adjacent tracks.

Obviously, the actuators Q are controlled by an electronic system which, in addition to discriminating the length and the number of the strips, controls the actuation sequence of the flaps P according to the tracks to be fed.

BRIEF DESCRIPTION OF THE DRAWINGS

The apparatus according to the present invention, combined with the above described conveyor, is described hereinafter with the aid of ten drawings which show merely by way of non-limitative example.

DESCRIPTION OF THE PREFERRED EMBODIMENTS

Figure 1:
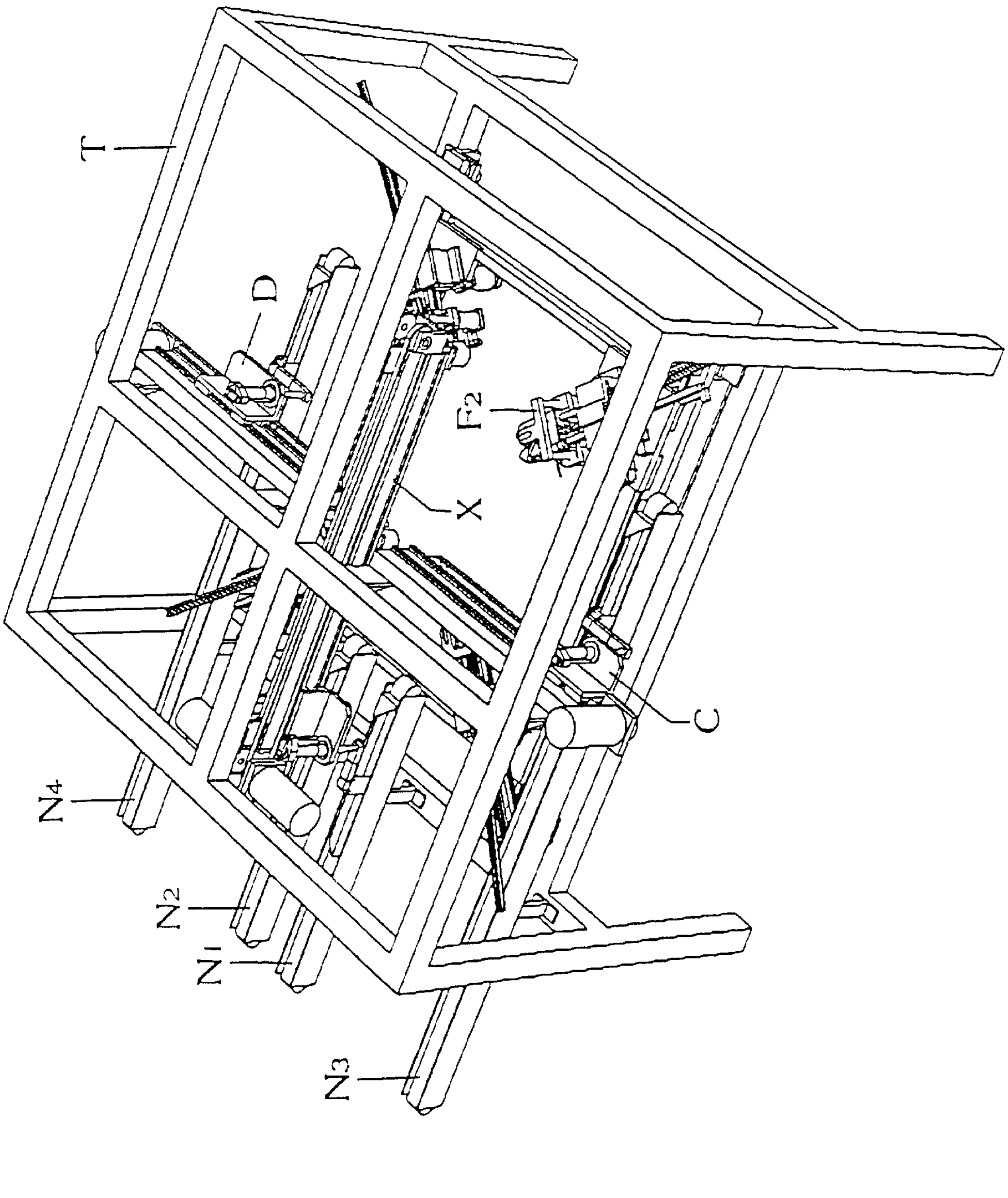
FIGS. 1 and 2, which are a perspective view and a plan view of the apparatus according to the present invention.
Figure 2:
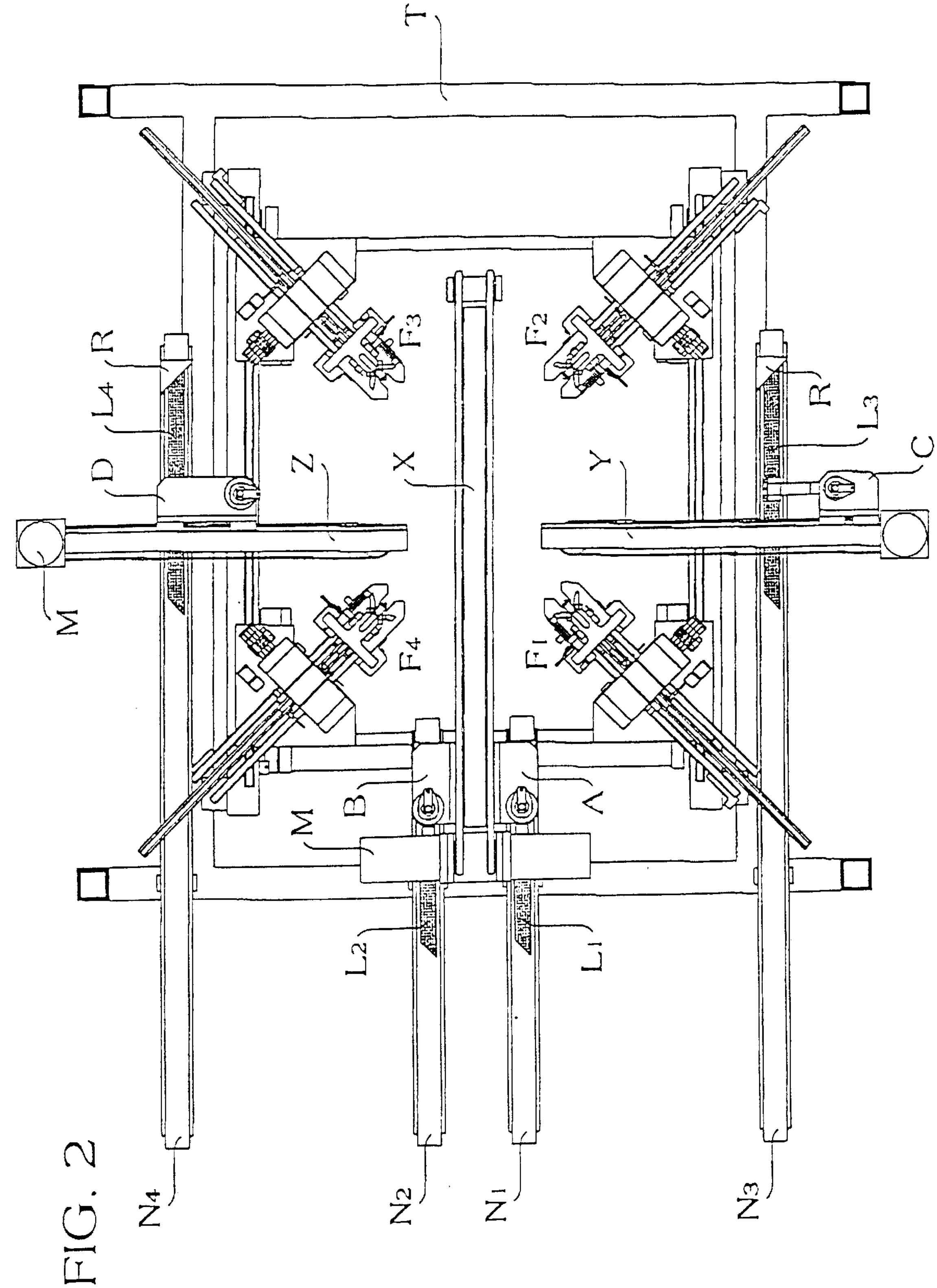

A first summary examination of the accompanying drawings, particularly of the general views of FIGS. 1 and 2, shows first of all that the apparatus is constituted by a frame T on which four stapling units (F1-F2-F3-F4) of the machine that forms rectangular frames are mounted; the stapling units are surmounted by a feeding system, also mounted on the frame T, which is provided with four carriages (A-B-C-D) which pick up a corresponding number of strips (L1-L2-L3-L4) from respective conveyor belts (N1-N2-N3-N4), fed in any manner; and then deposit them in the underlying stapling units, forming the frame.

For the sake of simplicity in description, the apparatus comprises a movement system (FIGS. 3 and 4) which is composed of three units: a central movement unit, which nonlimitatively includes the two carriages A and B and a horizontal beam X, in the opposite vertical faces of which the corresponding pairs of sliding guides 1 for the sliders of the carriages are provided; a right transverse movement unit, which nonlimitatively includes the carriage C and a horizontal beam Y which has, on a vertical face, a pair of sliding guides 1 for the sliders of the carriage; a left transverse movement unit, which nonlimitatively includes the carriage D and a horizontal beam Z which has, in a vertical face, the pair of sliding guides 1 for the sliders of the carriage.

Figure 3:
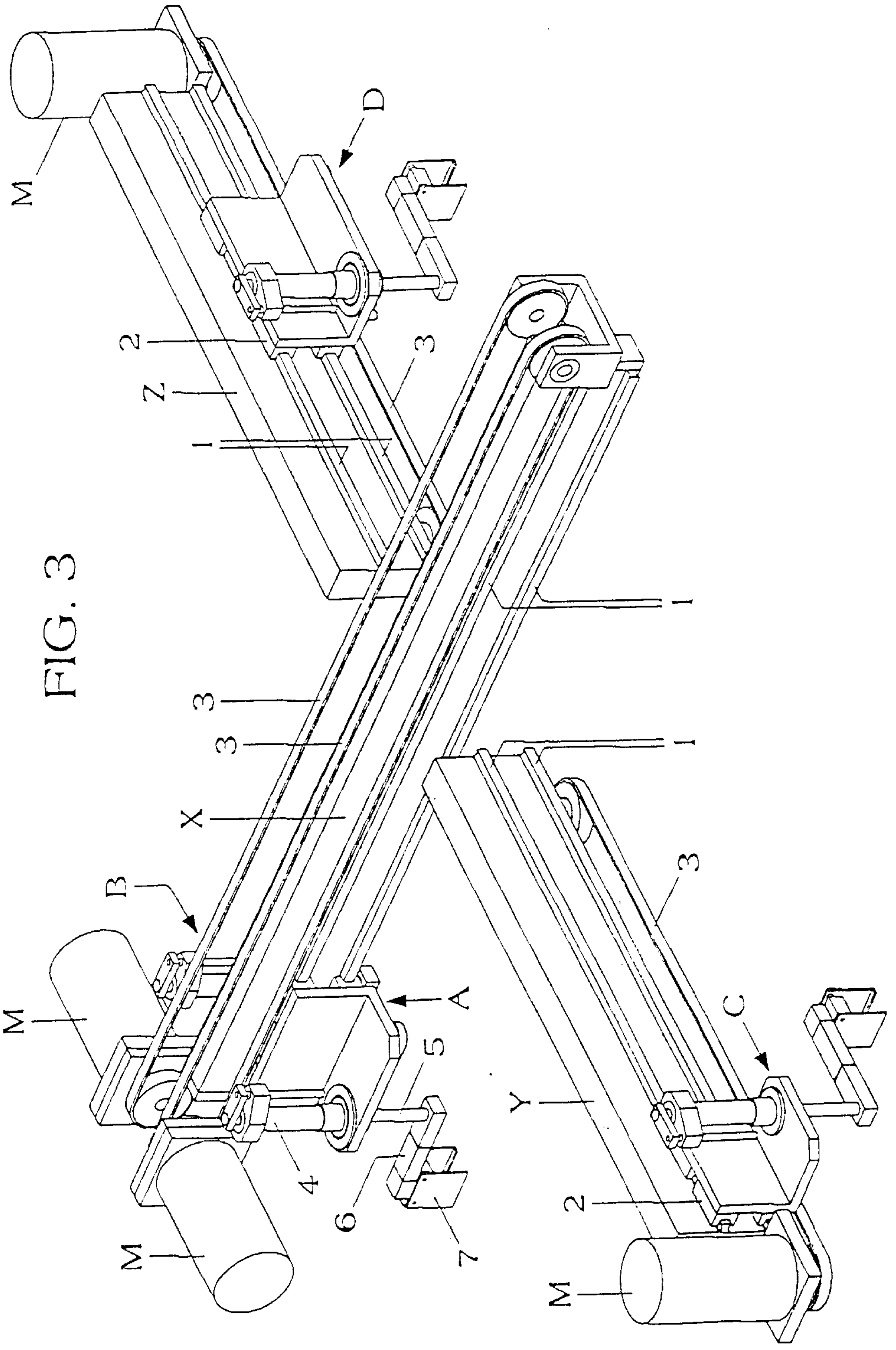
FIGS. 3 and 4 are two different perspective views of the assembly of the carriages and of the corresponding guides for moving the strips, according to the present invention.
Figure 4:
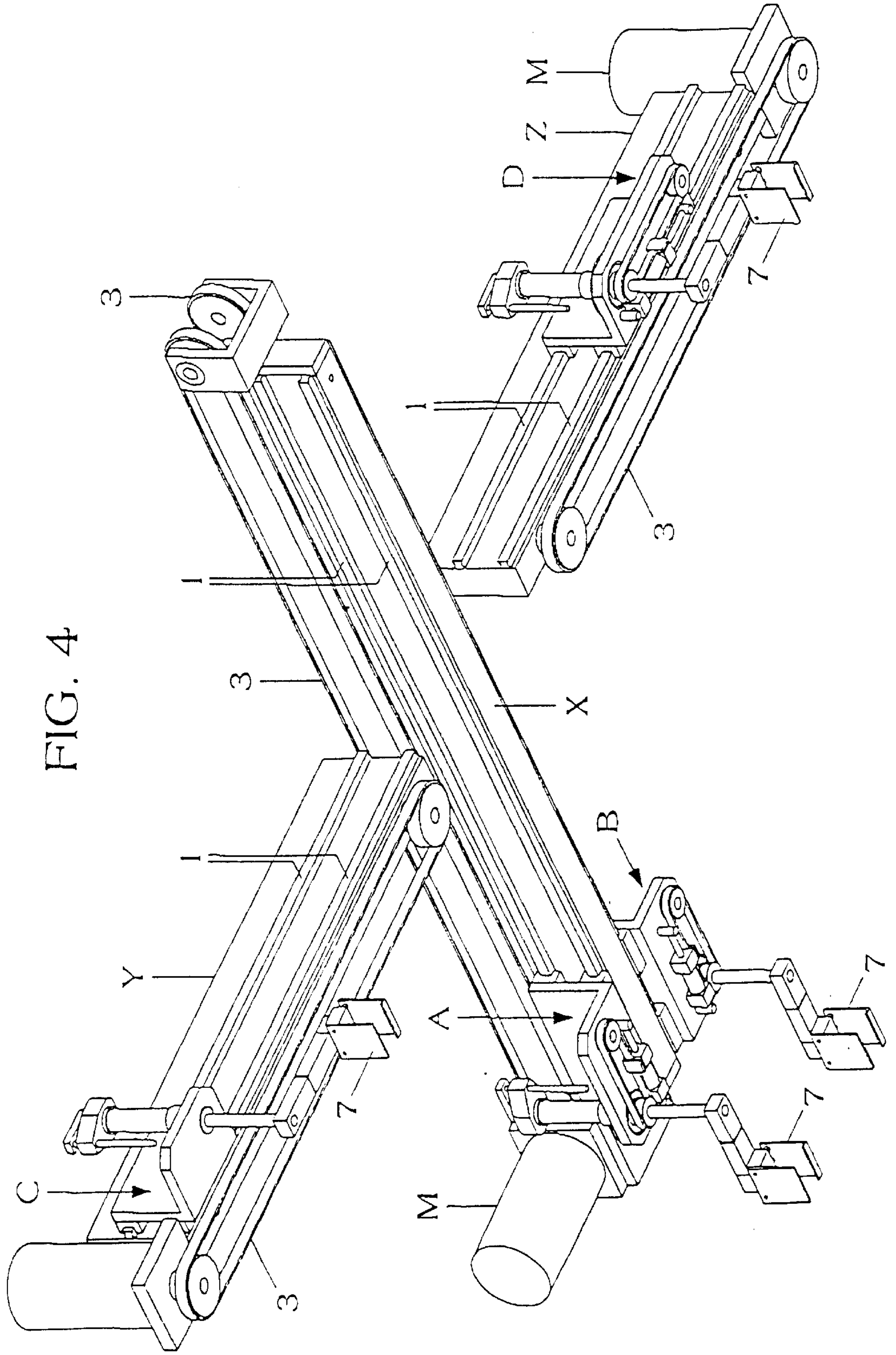
Figure 5:
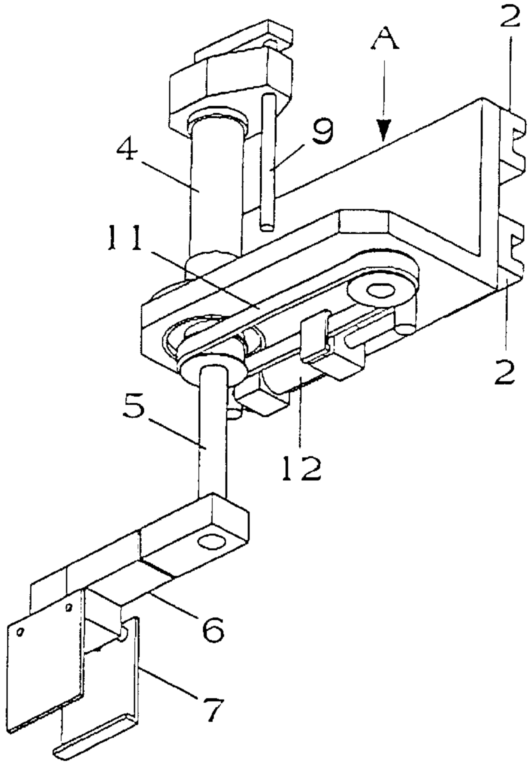
FIGS. 5 and 6, which are two perspective views of the right carriage of the central movement unit.
Figure 7:
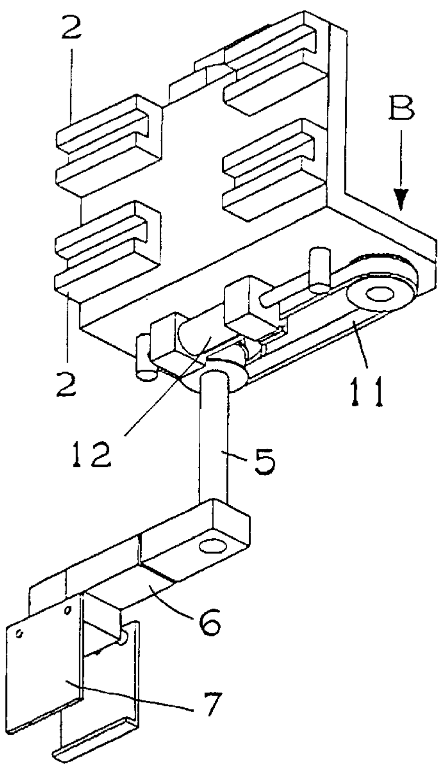
FIGS. 7 and 8, which are two different perspective views of the left carriage of the central movement unit.
Figure 6:
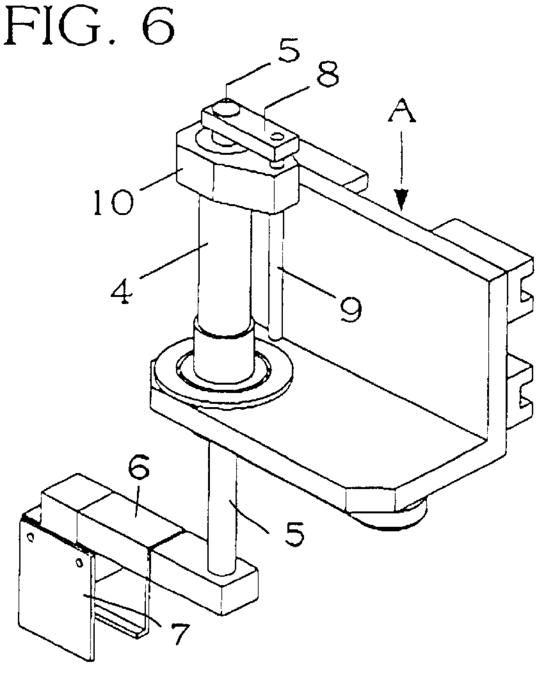
Figure 8:
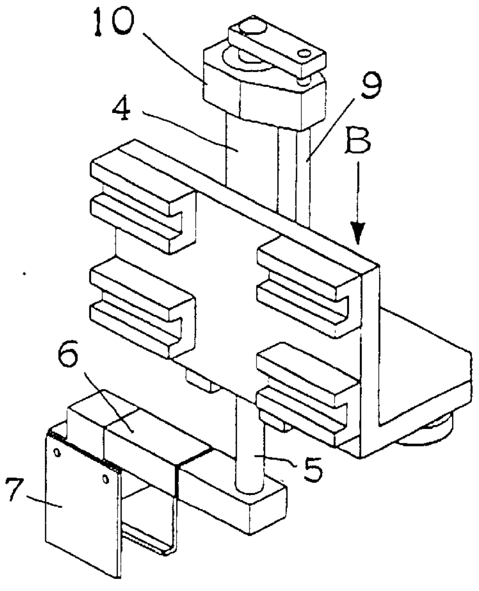
Figure 9:
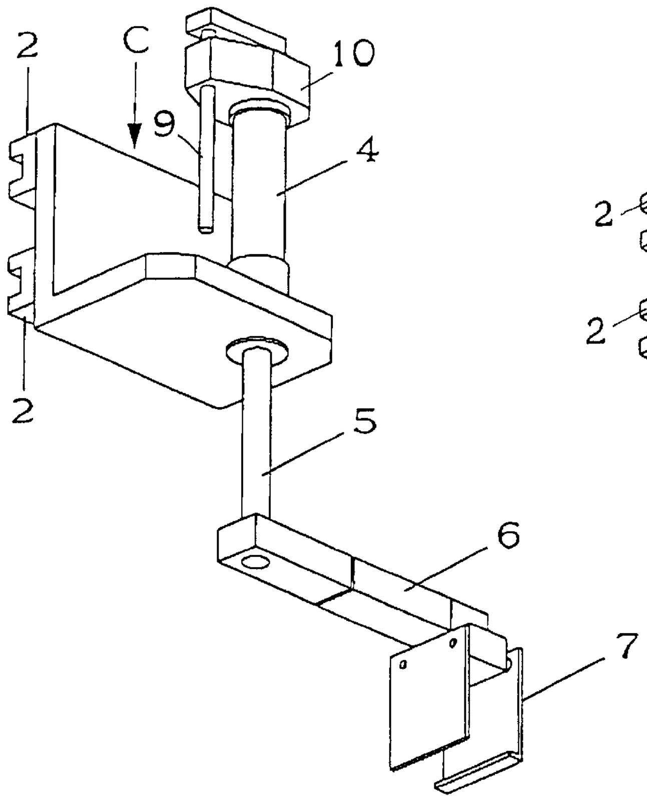
FIGS. 9 and 10 are two different perspective views of the single carriage of the transverse movement unit located to the right of the central one.
Figure 11:
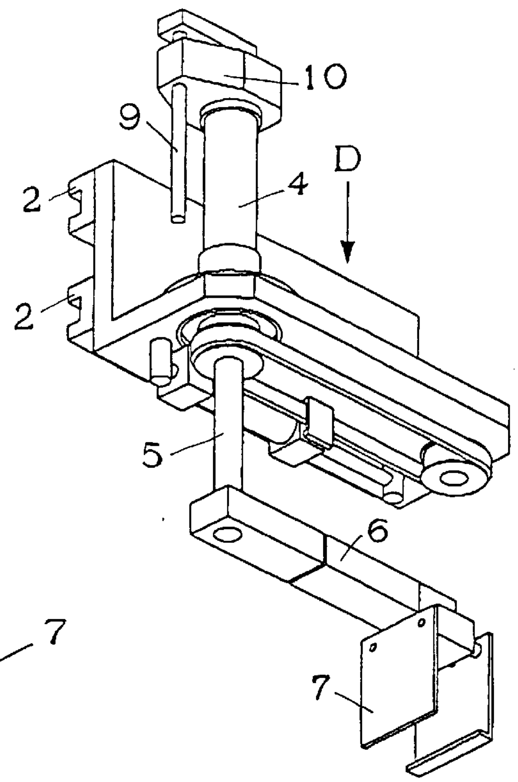
FIGS. 11 and 12, which are two different perspective views of the single carriage of the transverse movement unit located to the left of the central one.
Figure 10:
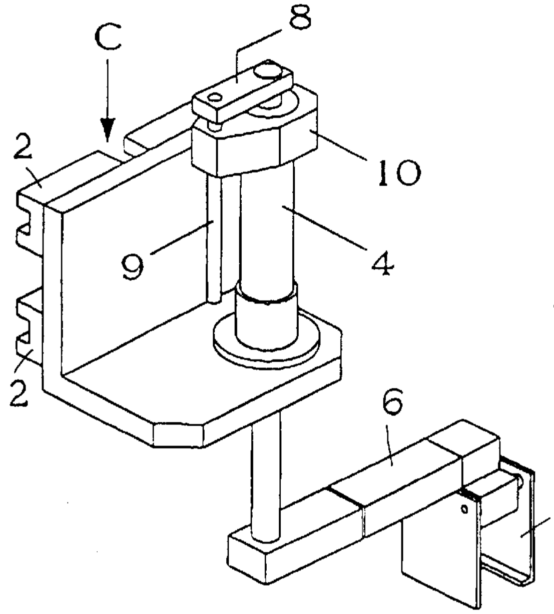
Figure 12:
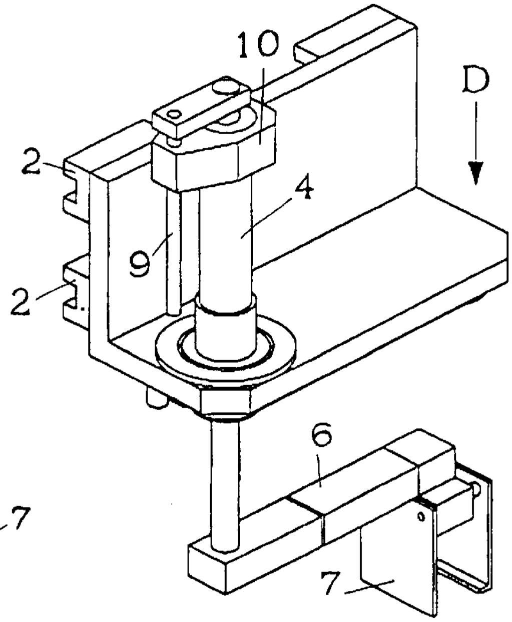

FIGS. 3 and 4, and the FIGS. 5–12, show that each one of the four carriages (A-B-C-D), in addition to being provided with sliders 2 to be engaged in appropriate sliding guides 1, is stably connected to a toothed belt 3 which is stretched between two pulleys, of which one is keyed or in any case rigidly coupled to the shaft of an electric gearmotor M which is controlled electronically, and produces the linear translational motion of the carriage in both directions.

Furthermore, a pneumatic cylinder 4 is vertically supported in a horizontal flat portion of each one of the four carriages and its stem 5 protrudes downward, ending with a horizontal arm 6 provided with a pneumatic clamp 7 by virtue of which one of the strips L1-L2-L3-L4 can be gripped centrally.

Figure 13:
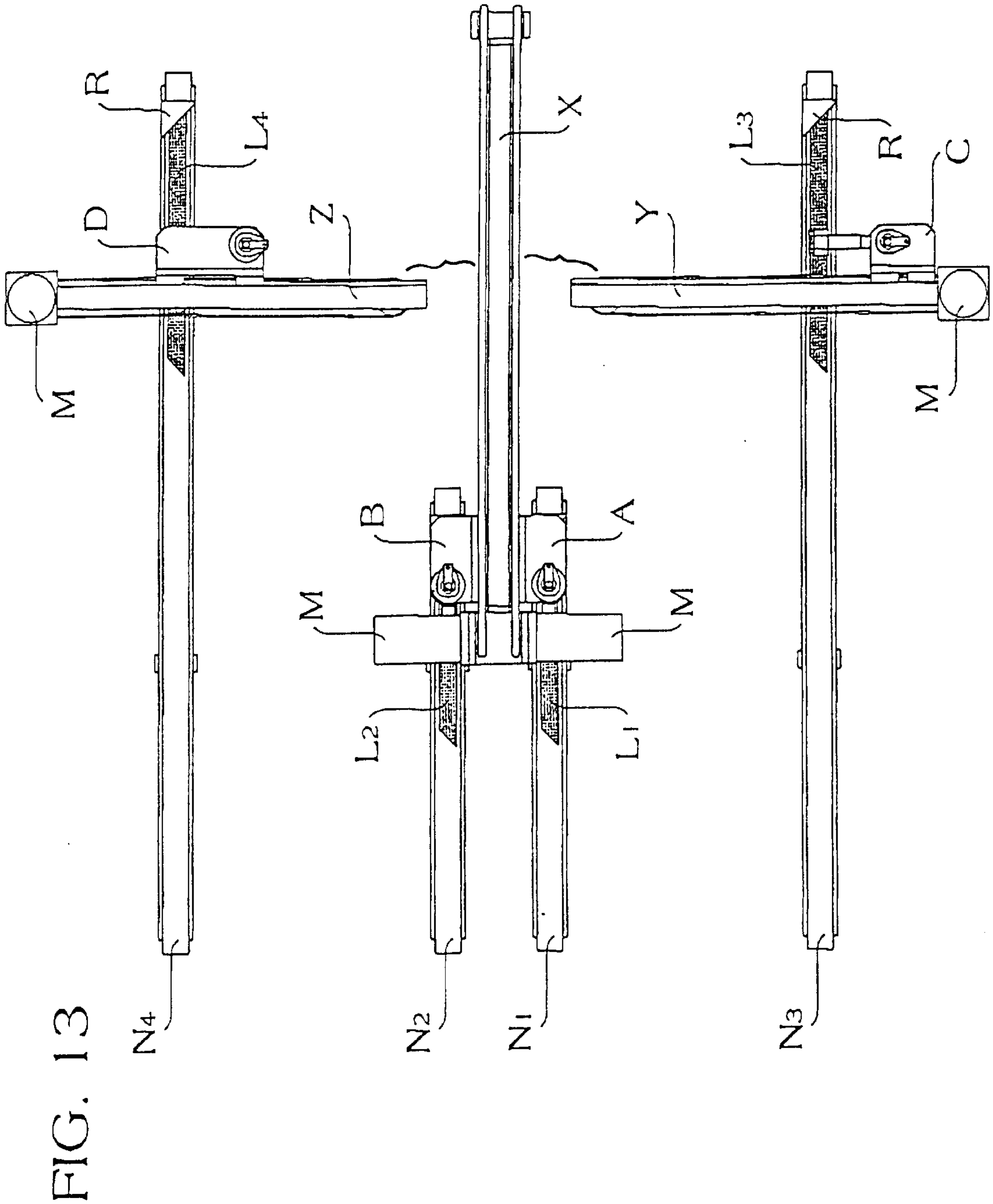
FIGS. 13 and 14 schematically illustrate the feeder means by showing, from above, only the strip movement units and the conveyor belts that feed them.
Figure 14:
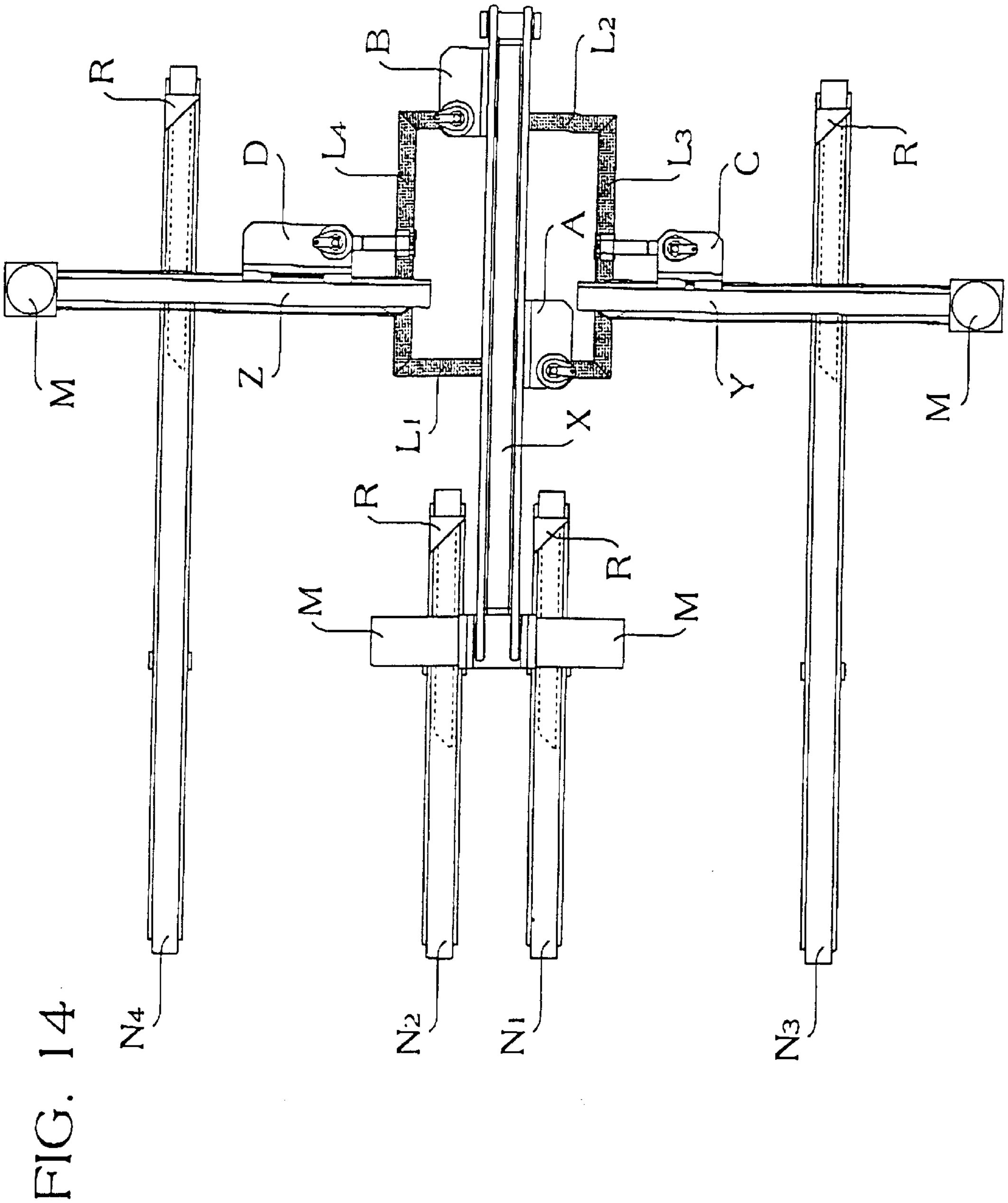

By virtue of a guide 10, which is fixed to the pneumatic cylinder 4 so that a rod 9 connected to a stem 5 by virtue of a connecting element 8 can slide therein, the stem 5 and the cylinder 4 are mutually rigidly coupled both when, as for the carriage C, the arm 6 of the clamp 7 does not have to perform any rotation and deposits the strip L3 (FIG. 14) with the same orientation with which it picked it up (FIG. 13), and when, as in the example of FIGS. 13 and 14, each one of the strips L1-L2-L4 requires a particular individual rotation.

Accordingly, while the strip L3 conveyed by the carriage C is subjected only to a linear translational motion, the remaining three strips, before being deposited on the stapling units, must also be rotated as follows: the strip L1 of the carriage A must be rotated clockwise through 90°; the strip L2 of the carriage B must be rotated counterclockwise through 90°; and the strip L4 of the carriage D must be rotated clockwise through 180°.

In the carriages A-B-D, in order to achieve these rotations, the pneumatic cylinder 4 is rotationally supported by means of a bearing and is coaxially rigidly coupled to one of the two pulleys that stretch a toothed belt 11 on which an appropriately provided pneumatic cylinder 12 acts in a linear fashion alternately in one direction and the other.

It should be noted that when some carriages, such as A and B, have to pick up strips such as L1 and L2 which arrive on belts N1 and N2 arranged parallel to a transfer direction of the carriages (FIG. 13), the clamps 7 of the carriages (FIGS. 5–8) are mounted so that the clamped strips are parallel to the arms 6 of the clamps. Otherwise, when carriages, such as C and D, must pick up strips, such as L3 and L4, which arrive on belts N3 and N4 which are perpendicular to the transfer direction of the carriages, the clamps 7 of the carriages (FIGS. 9–12) are mounted so that the clamped strips are perpendicular to the arms of the clamps.

Figure 15:
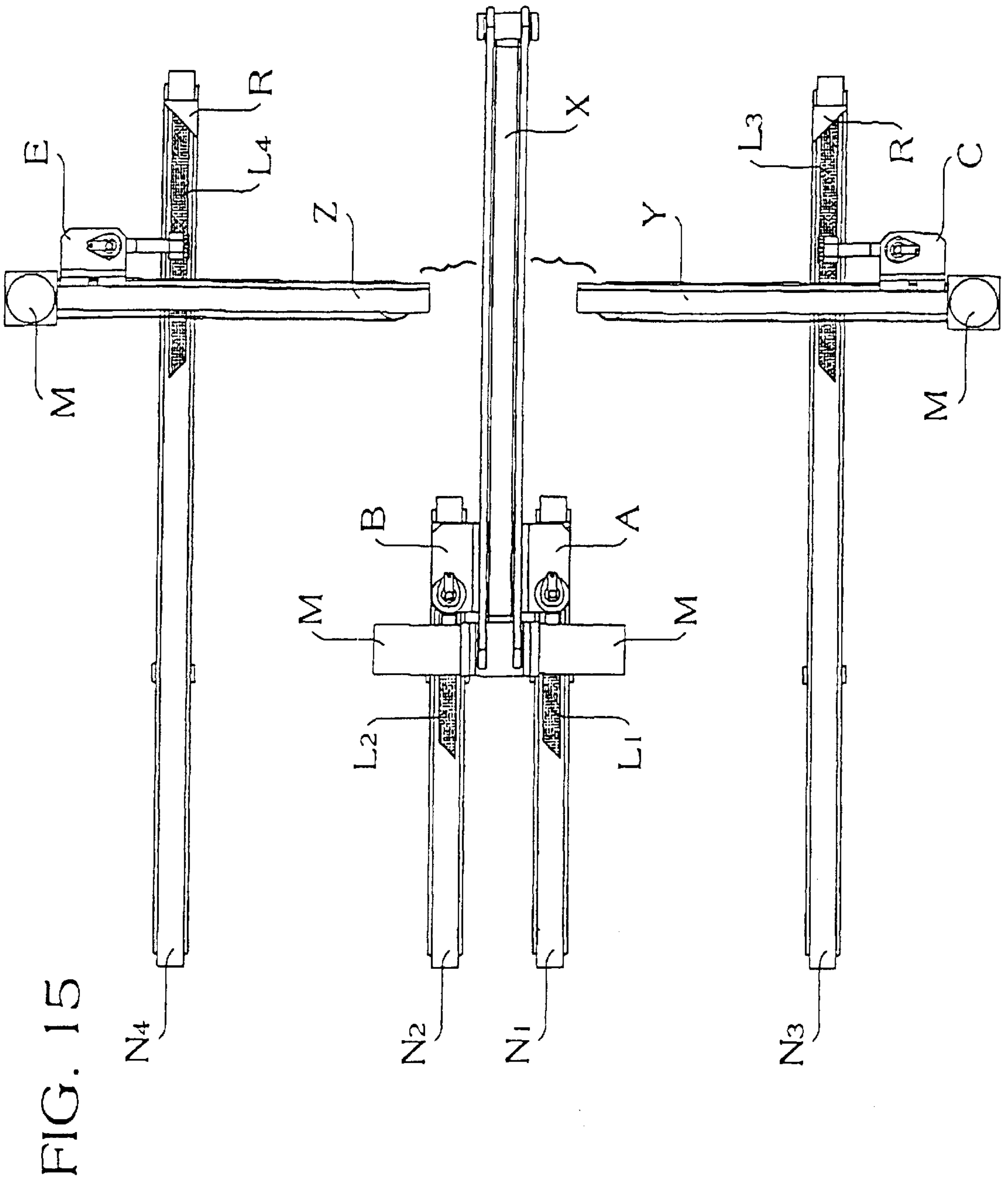
FIGS. 15 and 16 are a simplified top view and bottom view of the set of carriages with the corresponding guides which illustrate one of the possible embodiments of the apparatus illustrated in the preceding figures.
Figure 16:
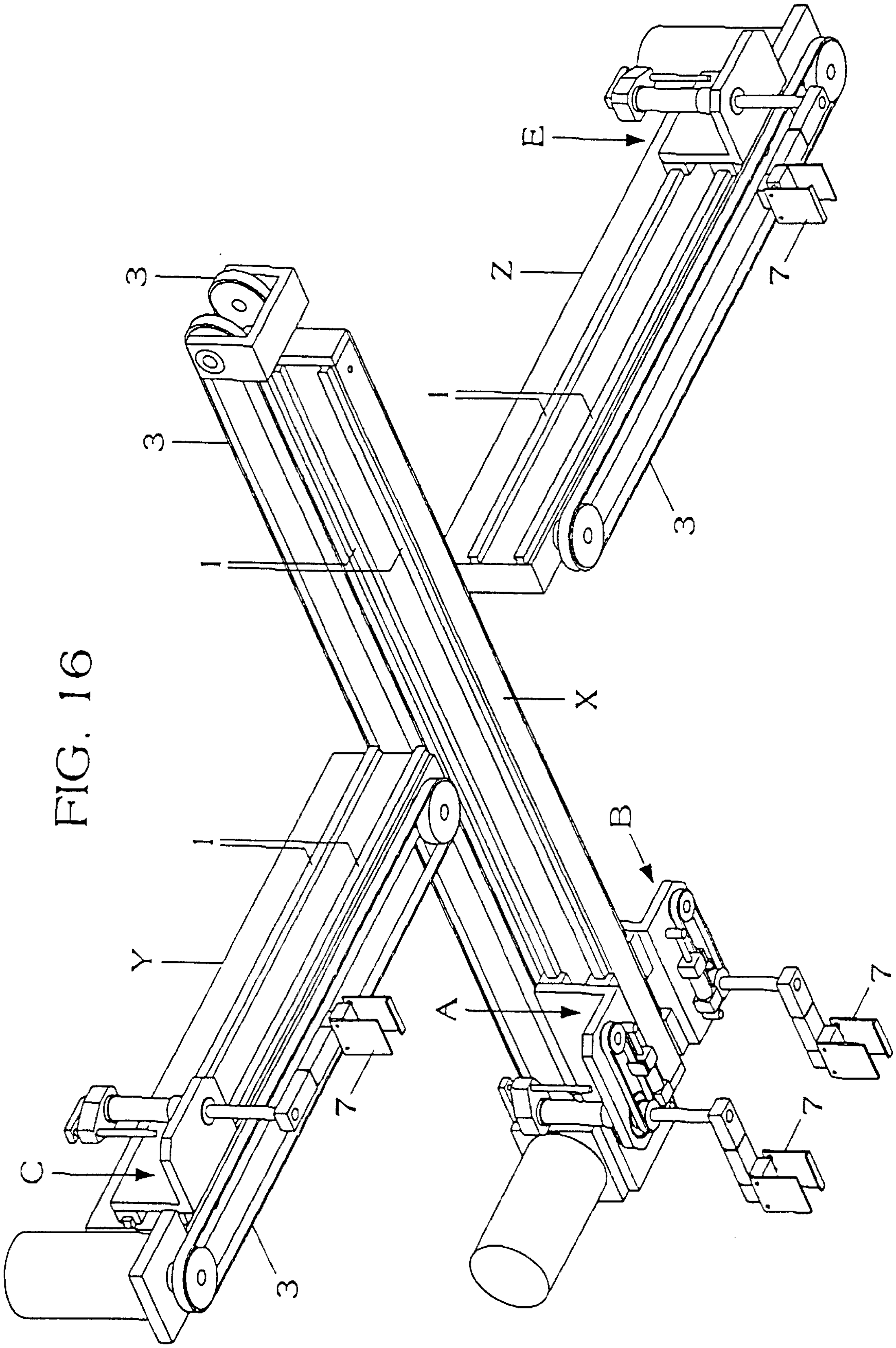
Figures 17, 18, 19:
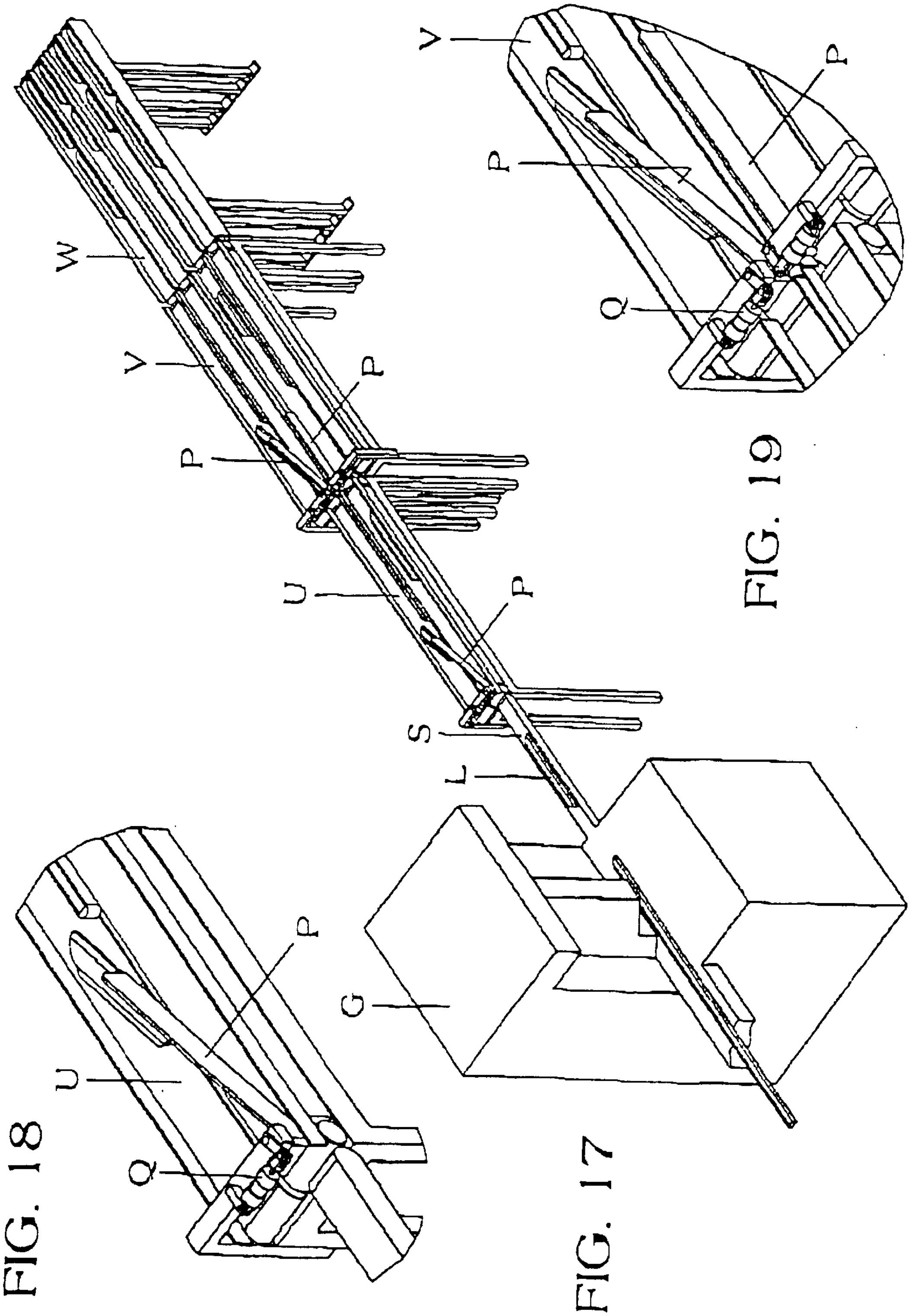
FIGS. 17-18-19 illustrate one of the possible ways of conveying the strips from a conventional type of cropping unit to an apparatus provided according to the present industrial patent.

As exemplified in FIGS. 15 and 16, the strip L4, either because it has already been turned through 180° or because of any other reason, might arrive on the conveyor belt N4 with an orientation which is opposite to the orientation of the remaining strips L1-L2-L3. In such circumstances, the left transverse movement unit, i.e., the unit of the beam Z, might use a carriage E which is mirror-symmetrically identical to the carriage C also in the orientation of the clamp 7, since like the carriage it is preset for the simple linear translational motion of the conveyed strip.

With reference to FIGS. 13 and 14, the conveyor belts N1-N2-N3-N4 convey the four strips to the respective pick-up regions formed by corresponding abutments R, which can be adjusted, according to the length of the individual strips, so that the pick-up clamps 7 of the carriages can grip them exactly at the center.

However, the abutments R of the belts N1 and N2 might also be fixed, since the carriages A and B, by moving in the same direction as the belts, can still be arranged at a center of the respective strips L1 and L2 regardless of their length.

It is noted that the three movement units, i.e., the central one and the two transverse ones, operate simultaneously and are synchronized so as to avoid collisions among the strips. This occurs also by virtue of the fact that the length of the stems 5 of the pneumatic cylinders 4 can allow, if necessary, to stagger the height of the strips so that they are transferred and/or rotated at different heights.

However, the arms 6, which protrude horizontally from the stems 5 and space the clamps 7 away from the stems, in addition to avoiding interference among the devices, especially in the production of small frames, also act as a shear joint in order to avoid worse damage in case of collisions due to any malfunction.

From the above description it is evident that once the strip L4 has been turned through 180° as shown in FIG. 15 and once the strips L1 and L2 have been turned through 90° clockwise and counterclockwise respectively, by actuating the four gearmotors M that move the belts 3 for advancing the four carriages A, B, C, D, the strips are arranged adjacent to each other until their ends, chamfered at 45°, mutually abut. Then the stapling units F1–F4 is insert the staples in the joints of the strips; by joining the strips, said staples form the frame (see FIG. 14).

Finally, it should be added that the apparatus according to the present invention, without altering the illustrated and described general characteristics, is susceptible of further modifications and variations, which are in any case within the scope of the patent, that might become necessary in the practical execution of the machine illustrated and described herein merely by way of example.

The disclosures in Italian Patent Application No. FO2000A000011 from which this application claims priority are incorporated herein by reference.

What is claimed is:

1. An automated apparatus for feeding and positioning strips in machines for making rectangular frames which are equipped with four stapling units for joining, by means of steel staples, the strips that form the frames, wherein the strips are picked from corresponding conveyor belts and are transferred and positioned correctly in the stapling units by four motorized carriages which are provided with rotating arms fitted with clamps for gripping the individual strips and move on their respective guides, which are parallel to the conveyor belts that feed the strips for a first couple of the carriages and are perpendicular to said conveyor belts for a second couple of the carriages.

2. The apparatus according to claim 1, wherein the carriages are provided with sliders to engage each carriage slidingly in a pair of sliding guides, the pair of guides for a first one of the carriages and a pair of guides for a second one of the carriages being each located in one of two opposite vertical faces of a horizontal beam which lies parallel to the conveyor belts of the strips and at right angles to further beams, in a vertical face of which the pair of sliding guides in which a third one and fourth one of the carriages are to be engaged respectively is located.

3. The apparatus according to claim 2, wherein each one of the four carriages is connected to a toothed belt which is stretched between two pulleys, one of said pulleys being coupled to a shaft of an electric gearmotor, and determines a linear translational motion of the carriage in both directions.

4. The apparatus according to claim 3, wherein a pneumatic cylinder is vertically supported in each one of the four carriages, a stem of the cylinder protruding downward and ending with a horizontal arm which is provided with a clamp for gripping centrally one of the strips for forming the frame.

5. The apparatus according to claim 4, wherein a guide is fixed to the pneumatic cylinder and a rod connected to the stem by a connecting element can slide therein, said stem and the cylinder being mutually rigidly coupled.

6. The apparatus according to claim 5, wherein pneumatic cylinder is rotationally supported by a bearing and is coaxially rigidly coupled to one of the two pulleys that stretch a toothed belt on which a cylinder acts in a linear fashion in alternating directions.

7. The apparatus according to claim 6, wherein a further carriage is provided which is mirror-symmetrically identical to the one of the carriages.

8. The apparatus according to claim 1, wherein the conveyor belts convey the four strips up to the respective pick-up regions formed by corresponding abutments which are adjusted according to the length of the individual strips and so that the pick-up clamps of the carriages can grip said strips exactly at the center.

9. The apparatus according to claim 8, wherein the abutments of a first one and a second one of the belts are fixed.

10. The apparatus according to claim 4, wherein said carriages and said clamps are controlled by an electronic computer.

* * * * *